United States Patent
Cole et al.

(10) Patent No.: US 7,442,748 B2
(45) Date of Patent: Oct. 28, 2008

(54) CONTINUOUS POLYMERIZATION REACTOR

(75) Inventors: William M. Cole, Clinton, OH (US); David M. Roggeman, North Royalton, OH (US)

(73) Assignee: Bridgestone Corporation, Tokyo (JP)

( * ) Notice: Subject to any disclaimer, the term of this patent is extended or adjusted under 35 U.S.C. 154(b) by 209 days.

(21) Appl. No.: 11/069,679

(22) Filed: Mar. 1, 2005

(65) Prior Publication Data

US 2005/0245696 A1    Nov. 3, 2005

Related U.S. Application Data

(60) Provisional application No. 60/548,998, filed on Mar. 1, 2004.

(51) Int. Cl.
*C08F 2/00*   (2006.01)

(52) U.S. Cl. .............................. 526/64; 526/72; 422/132

(58) Field of Classification Search .................... 526/64, 526/72
See application file for complete search history.

(56) References Cited

U.S. PATENT DOCUMENTS

| | | | | |
|---|---|---|---|---|
| 2,636,026 A * | 4/1953 | Nelson | ......................... | 526/64 |
| 5,227,425 A | 7/1993 | Rauline | ....................... | 524/493 |
| 5,279,463 A | 1/1994 | Holl | ............................. | 241/1 |
| 5,335,992 A | 8/1994 | Holl | ........................... | 366/348 |
| 5,538,191 A | 7/1996 | Holl | ............................. | 241/1 |
| 5,717,022 A | 2/1998 | Beckmann et al. | ........... | 524/493 |
| 5,719,207 A | 2/1998 | Cohen et al. | ................. | 524/213 |
| 5,866,171 A | 2/1999 | Kata | ............................ | 425/46 |
| 5,876,527 A | 3/1999 | Tsuruta et al. | ............... | 152/541 |
| 5,931,211 A | 8/1999 | Tamura | .................... | 152/209.5 |
| 5,971,046 A | 10/1999 | Koch et al. | ................ | 152/152.1 |
| 6,133,376 A | 10/2000 | Hsieh et al. | ................. | 525/101 |
| 6,471,392 B1 * | 10/2002 | Holl et al. | ................... | 366/279 |
| 6,742,774 B2 | 6/2004 | Holl | ............................ | 261/83 |
| 6,752,529 B2 | 6/2004 | Holl | ............................ | 366/279 |
| 2003/0044331 A1 * | 3/2003 | DeBellis et al. | ............. | 422/198 |

FOREIGN PATENT DOCUMENTS

| | | |
|---|---|---|
| DE | 19960389 | 12/1999 |
| DE | 890 606 | 2/2003 |
| EP | 0890580 | 1/1999 |
| WO | 02/057358 | 7/2002 |
| WO | 2004/039491 | 5/2004 |

OTHER PUBLICATIONS

Bob A. Howell, "Medicated Radical Polymerization", ACS Division Of Polymeric Materials: Science and Engineering (PMSE), 83, 578 (2000).
English Abstract of DE19960389.
English Abstract of JP 07233619.

* cited by examiner

*Primary Examiner*—William K Cheung
(74) *Attorney, Agent, or Firm*—Arthur M. Reginelli; Meredith E. Hooker (57) ABSTRACT

A process for the continuous polymerization of monomer, the process comprising (a) adding monomer and catalyst to an annulus within an annular reactor to form a polymerization medium within the annulus, where the annulus includes the space between an outer casing wall and an inner tubular wall, (b) allowing the polymerization medium a sufficient residence time within the annulus to provide a living polymer product, and (c) removing the polymer product from the annulus.

12 Claims, 4 Drawing Sheets

CONTINUOUS POLYMERIZATION REACTOR

This application claims the benefit of U.S. Provisional Application No. 60/548,998 filed on Mar. 1, 2004.

FIELD OF THE INVENTION

This invention relates to a continuous polymerization process and reactor for conducting the process.

BACKGROUND OF THE INVENTION

In the production of polymers, such as elastomeric polymers by employing anionic or certain coordination catalysts systems, it is often desirable to synthesize polymers that have a narrow molecular weight distribution. When employing these reaction techniques, the molecular weight is directly proportional to the residence time of the reactants within the reactor (i.e., reaction time). As a result, it is often desirable to synthesize these polymers in a batch system because the residence time can be easily controlled. In other words, the reaction time for any of the reactants within a batch system can be controlled such that the individual reactants can each have a nearly identical or uniform reaction time.

Continuous systems have historically not been preferred for the production of polymers having narrow molecular weight distribution because the residence time of any of the given reactants within a continuous system cannot be easily controlled or regulated. Within a typical continuous plug flow system, parabolic velocity occurs within reactors of sufficient diameter resulting in a non-uniform range of residence times for the various reactants or products. As a result of this non-uniform residence time, a broad range of molecular weights results. This could possibly be alleviated by operating the system at very high fluid velocities, but this would result in very high system pressure drops when attempting to produce polymers having molecular weights of commercial interest.

Within a continuously stirred tank reactor (CSTR), the mixing of ingredients, which results in backmixing, likewise results in a non-uniform residence time among the various reactants or products. As a result of this non-uniform residence time, polymers having various molecular weight distributions are produced.

Because it would be advantageous to continuously polymerize polymers having a narrow molecular weight distribution, there is a need to develop a process or reactor that will allow for the continuous polymerization of monomer and achieve polymers having a narrow molecular weight distribution.

SUMMARY OF THE INVENTION

The present invention includes a process for the continuous polymerization of monomer, the process comprising (a) adding monomer and catalyst to an annulus within an annular reactor to form a polymerization medium within the annulus, where the annulus includes the space between an outer casing wall and an inner tubular wall, (b) allowing the polymerization medium a sufficient residence time within the annulus to provide a living polymer product, and (c) removing the polymer product from the annulus.

The present invention also includes a polymer produced by a process comprising the step of (a) adding monomer and catalyst to an annulus within an annular reactor to form a polymerization medium within the annulus, where the annulus includes the space between an outer casing wall and an inner tubular wall, (b) allowing the polymerization medium a sufficient residence time within the annulus to provide a living polymer product, and (c) removing the polymer product from the annulus.

DETAILED DESCRIPTION OF ILLUSTRATIVE EMBODIMENTS

In one or more embodiments, polymer is continuously synthesized within an annular reactor. By employing this reactor, the residence time of the reactants is substantially uniform, which advantageously provides polymer having a substantially uniform molecular weight (i.e., narrow molecular weight distribution).

In one or more embodiments, the annular reactor includes at least one reaction zone that is an annulus. The reactor may include other reaction zones that are in fluid communication with the annulus, and these other reaction zones may include non-annular reaction zones. The annular reactor may also include at least one inlet for the introduction of raw materials and at least one outlet for the removal of product.

Figure 1:
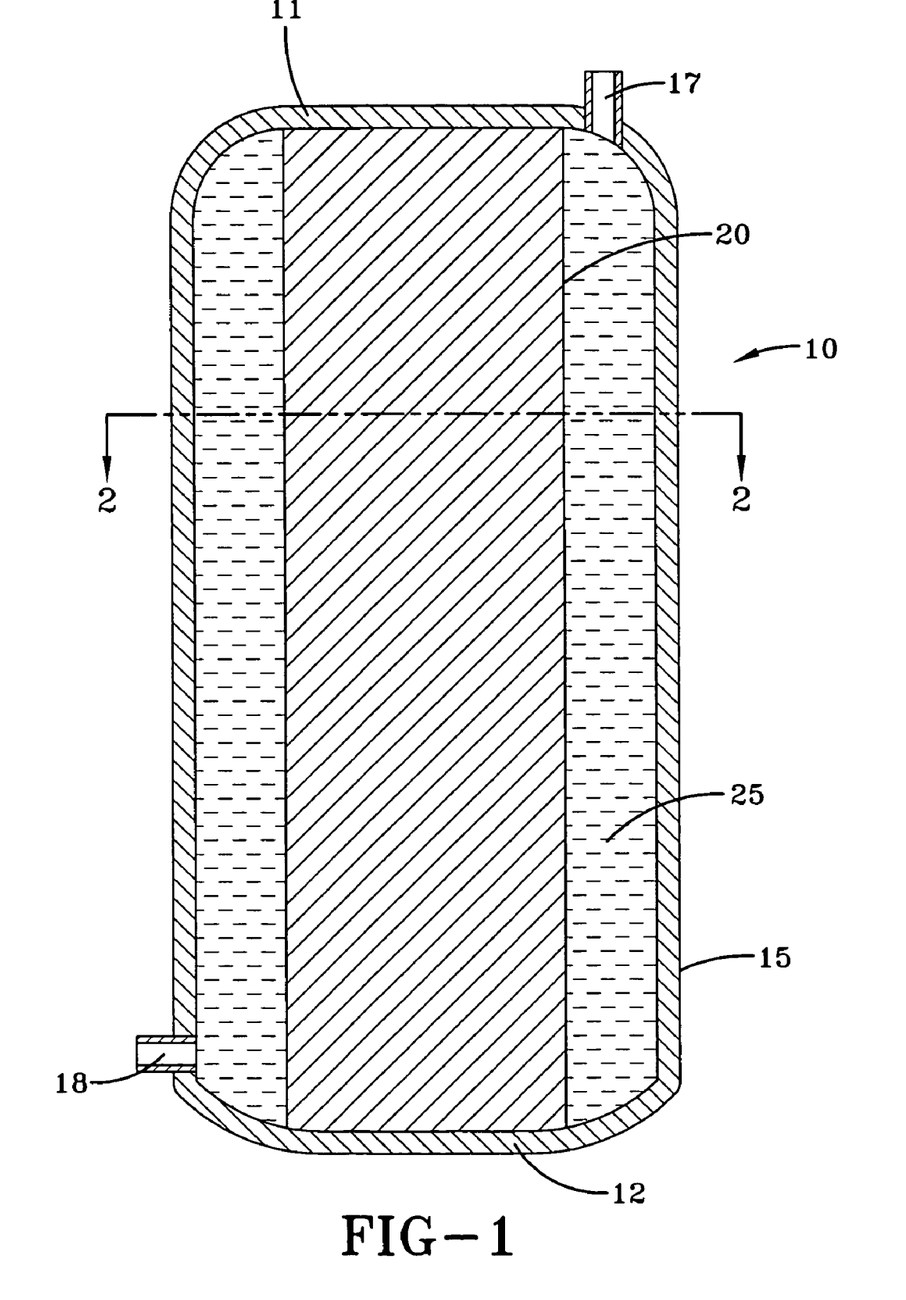
FIG. 1 is a cross-sectional view of an annular reaction zone within an annular reactor.
Figure 2:
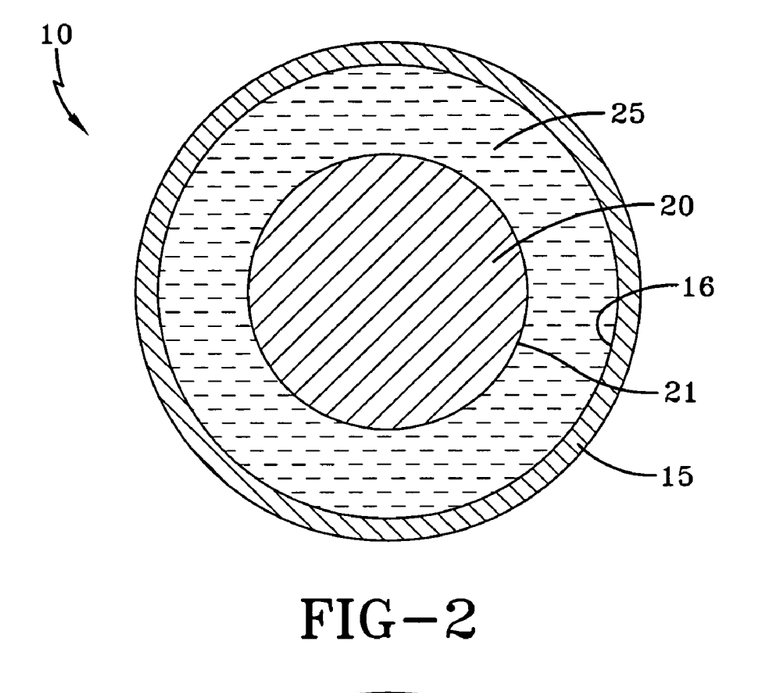
FIG. 2 is a cross-sectional view taken substantially along line 2-2.

The annulus or annular reaction zone of one or more embodiments can be described with reference to FIGS. 1 and 2. As shown in these figures, reactor 10 includes outer tubular casing 15. Concentric within and spaced from outer casing 15 is inner tubular 20. The space between tubular casing 15 and inner tubular 20 forms annulus 25, which is the annulus or annular reaction zone of the reactor. Reactor 10 preferably includes at least one outlet 17, which is preferably positioned at or near the top 11 of reactor 10, and preferably at least one inlet 18 at or near the bottom 12 of reactor 10. Other inlets (not shown) may be included for the introduction of reactant or catalyst.

Inner tubular 20 may be positioned within outer tubular casing 15 in a variety of manners by employing a variety of devices. In one embodiment, as generally shown in FIG. 1, inner tubular 20 can be fixedly attached to top 11 and bottom 12 of reactor 10. In other embodiments, as will be shown in subsequent embodiments, inner tubular 20 can be suspended within outer tubular casing 15 via supporting bar (not shown in FIG. 1). A similar supporting bar (not shown) may optionally be positioned at the bottom of the reactor. In one embodiment, inner tubular 20 extends to the top or near the top 11 of reactor 10. As a result of this configuration, annulus 25 extends to the top of the reactor 10. Where annulus 25 does not extend to the top of reactor 10, reactor 10 may include a non-annular zone adjacent to or near outlet 17 of reactor 10.

In one or more embodiments, the annular reaction zone is configured or modified so as to provide for radial turbulence and thereby reduce the impact of parabolic velocity on the polymerization medium. In one embodiment, radial turbulence can be provided by causing either the outer tubular casing 25 or the inner casing 20, or both, to rotate about their longitudinal axis. In one embodiment, inner tubular 20 rotates about its longitudinal axis while outer tubular 15 remains fixed.

Figure 3:
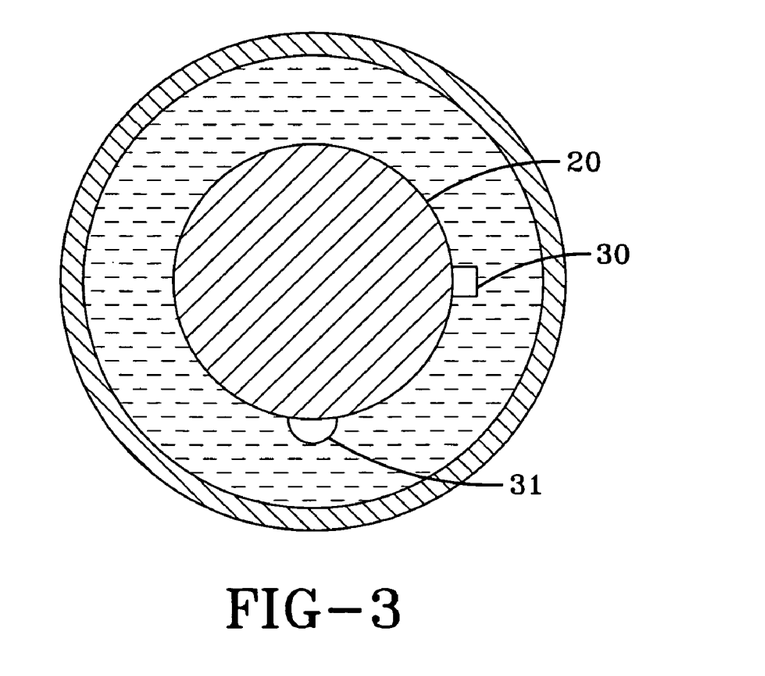
FIG. 3 is a cross-sectional view taken substantially along line 2-2.
Figure 4:
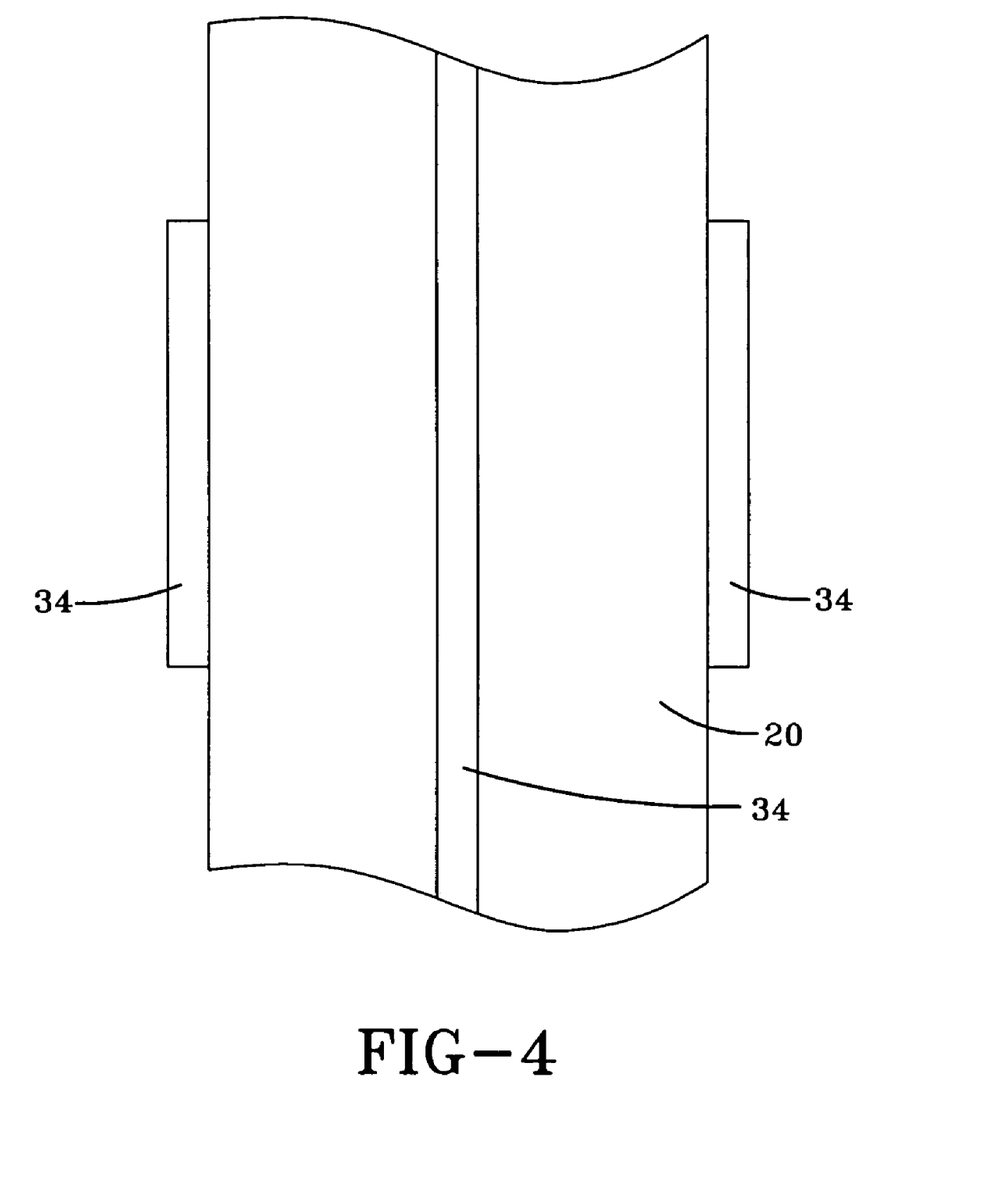
FIG. 4 is a is a fragmented view of an inner tubular having ribbed protrusions.

In one or more embodiments, protrusions 30 (FIG. 3) are attached to inner tubular 20. These protrusions are configured to impart a radial turbulence on the polymerization medium while imparting no or only minimal axial force or turbulence. The lack of axial force or turbulence, such as would be caused by some conventional mixing blades, ensures little to no backmixing. These protrusions may include clips (such as specifically shown at 30) as well as nodes 31 (FIG. 3) or ribs 34 (FIG. 4). Inner tubular 20 can be equipped with multiple protrusions around its circumference as well as multiple protrusions along its length. Protrusions can also be attached to outer tubular casing 15. In one embodiment, the use of multiple ribs extending the axial length of the inner tubular can advantageously increase turbulence in the reaction zone and strengthen the inner tubular, which advantageously allows for the use of thinner and lighter materials for the inner wall.

In preferred embodiments, the protrusions extend into annulus 25 but preferably do not contact outer tubular casing 15. The ratio of the length of the protrusions (i.e., the distance that the protrusions extend into the annulus) can be represented by the ratio of the length of the protrusions to the cross-sectional length of the annulus (i.e., the difference in radii between the outer casing 15 and the inner tubular 20). In certain embodiments, this ratio is from about 0.1:1 to about 0.6:1, and in other embodiments from about 0.2:1 to about 0.4:1.

The size of annulus 25 may vary, although operation of the reactor may need to be modified based on the size of the annulus. In one or more embodiments, the width of annulus 25 is constant throughout the entire length of the annulus.

One measurement of size of the annulus 25 is the distance between outer tubular casing 15 and inner tubular 20. In other words, as shown in FIG. 2, the size of annulus 25 can be represented by the difference in the diameter ($D_1$) of the outer casing 15 and the diameter ($D_2$) of the inner tubular 20. In one or more embodiments, the size of the annulus can be represented by the ratio of $D_1$ to $D_2$, which can be in the range from about 1:2 to about 1:0.2, in other embodiments from about 1:1.1 to about 1:0.4, and in other embodiments from about 1:1.0 to about 1:0.6.

In one or more embodiments, the size of the annulus may further be defined by those parameters necessary to meet or achieve a Reynolds number that is greater than 7.8, in other embodiments greater than 10, and in other embodiments greater than 12, based on the equation Reynolds Number=$N*(D_2/D_1)*D_1^2*\rho/\mu$ where N is the rotational speed of the shaft in revolutions per second, $D_1$ is the length of inner casing diameter, $D_2$ is the length of the tubular diameter, $\rho$ is the cement density in kg/m$^3$, and $\mu$ is cement viscosity Kg/m.s. This equation is known to those skilled in the art as explained in TRANSPORT PHENOMENA by Bird et al., Wiley Press 1960, p. 96, which is incorporated herein by reference.

The length of the reactor, and particularly the length of the annular reaction zone, can vary. Indeed, because the velocity of the polymerization medium traveling through the annulus can be controlled and manipulated to control the residence time, then the length can be varied with respect to the length. In one or more embodiments, the length is sufficient so that the residence time in annulus 25 is sufficient to reach the desired monomer conversion for a given monomer, monomer concentration, catalyst type, catalyst concentration, and temperature. In one or more embodiments, the reaction time required can approximate that needed for a batch reaction at the specified concentrations and temperature.

Figure 5:
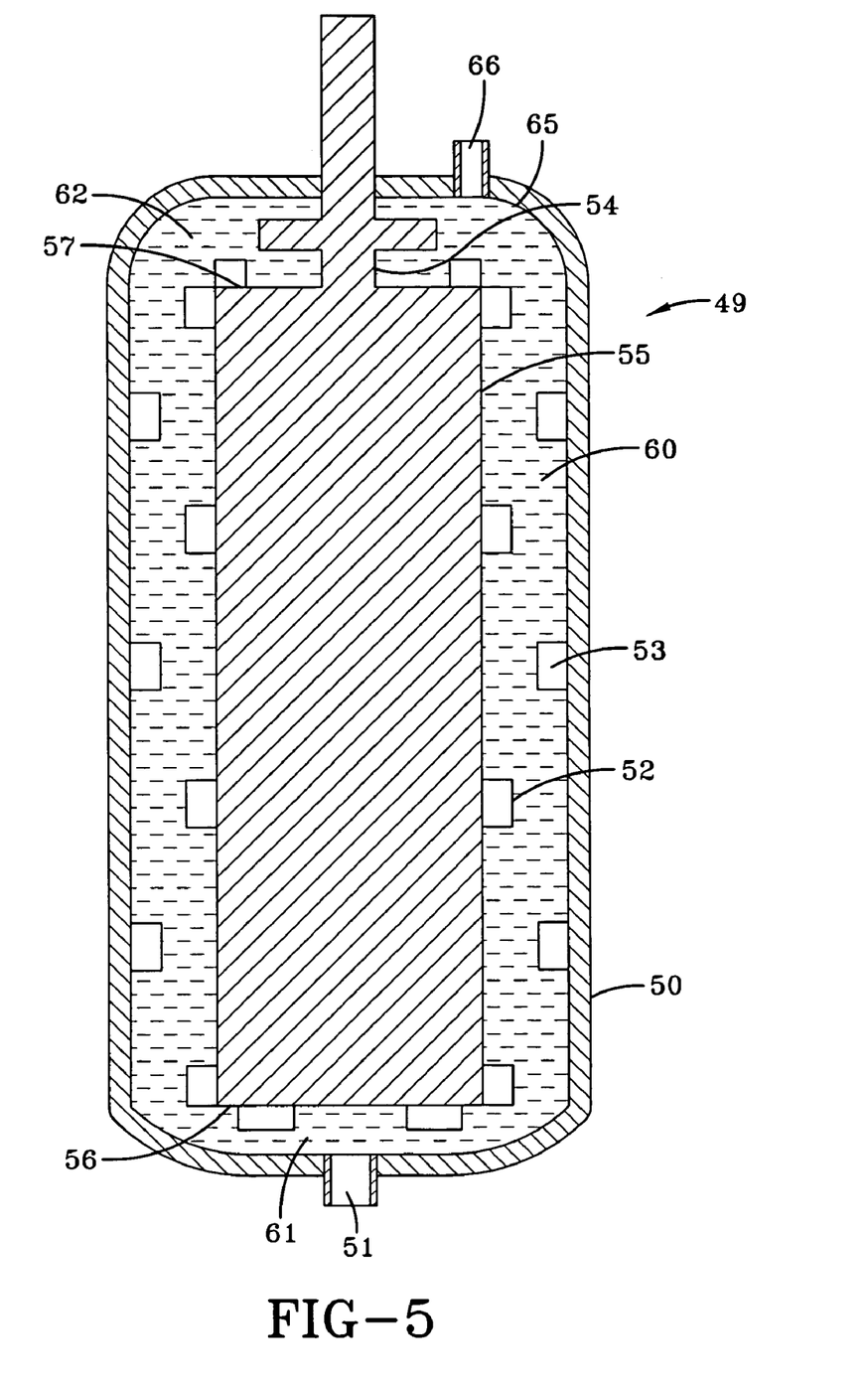
FIG. 5 is a cross-sectional view of a CSTR with an enlarged shaft.

In one embodiment, as shown in FIG. 5, an annular reactor can be achieved by employing a conventional tank reactor, such as a continuously stirred tank reactor (CSTR), where the mixing shaft thereof is enlarged or modified so as to create an annulus between the reactor shaft and the outer reactor wall. For example, and as shown in FIG. 5, reactor 49 includes impeller shaft 54, which has affixed thereto tubular casing 55. This configuration creates annulus 60 between tubular casing 55 and reactor shell 50.

The configuration or contents of the inner portion or space within tubular 55 can vary. In one embodiment, the space can remain hollow (i.e., tubular 55 is simply a shell, and the contents thereof include air or a vacuum can be established). In other embodiments, the space is solid. For example, the space can include the same material that tubular 55 is constructed. Or, space 58 can be filled with other materials such as light weight polymers or foams. In yet other embodiments, a heat sink fluid can be circulated through or within inner tubular 55. The heat sink fluid, such as water, could be introduced and withdrawn from inner tubular 55 by way of a rotary joint (not shown).

Reactor 49 may also include an outer jacket (not shown), which can include a heat sink fluid such as water, to likewise act as a heat sink through reactor casing 50.

Inner tubular 55 can be suspended from shaft 54. Inner tubular 55 may optionally include protrusions such as clips 52. Annular reactor 49 also includes inlet 51 and outlet 66. Due to the configuration of annular reactor 49 shown in FIG. 5, annular reactor 49 includes at least three distinct reaction zones. First reaction zone 61 exists below the bottom 56 of inner tubular 55. This is a non-annular reaction zone. Second reaction zone 60 is the annular space between inner tubular 55 and outer reactor casing 50. Third reaction zone 62 exists above the top of tubular casing 57. As with first reaction zone 61, reaction zone 62 is likewise non-annular. As is shown in FIG. 5, the bottom 56 and top 57 of tubular casing 55 seal the cylindrical void within inner tubular 55 so as to prevent the polymerization medium from entering into tubular 55. Bottom 56 and top 57 may also optionally include clips to enhance mixing in the respective reaction zones.

In the typical operation of the annular reactor, monomer, solvent, and catalyst (i.e., polymerization ingredients) are introduced either separately or in some pre-mixed combination into the reactor via one or more inlets such as inlet 51 shown in FIG. 5. Depending on the reactor design, these ingredients enter a first reaction zone that may be annular or, as specifically shown in FIG. 5, non-annular first reaction zone 61. These ingredients, which form the polymerization medium, are then forced into the annular reaction zone 60 as shown in FIG. 5 toward the top of the reactor 65. In typical operation, the polymerization medium is driven from the bottom of the reactor toward the top of the reactor where at least one outlet, such as 66, exists. Practice of this invention, however, need not limited to a reactor where raw material is fed into the bottom of the reactor and product is removed from the top of the reactor. Also, the reactor need not be positioned vertically as shown in FIG. 5, but it may also be positioned horizontally or at an angle.

While the polymerization medium is driven through annulus 60, inner tubular 55 can rotate about its longitudinal axis. In one or more embodiments, the inner tubular is rotated from about 5 to about 500 rpm, and in other embodiments from about 10 to about 200 rpm. Clips 52, which are attached to inner tubular 55, likewise rotate about the longitudinal axis of shaft 54 and thereby create radial turbulence toward outer reactor casing 50.

In certain embodiments, the superficial velocity of the cement (i.e., the polymerization medium) flowing through the annular reactor, which can dimensionally be represented in meters per second (m/s), is greater than or equal to $5 \times 10^{-5}$ and in other embodiments greater than $7 \times 10^{-5}$. As those skilled in the art will appreciate, the superficial velocity (V) can be defined by the equation $$V = F/(\pi/4 \ast (D_1^2 - D_2^2))$$

where V is the superficial upward velocity of the cement, F is the cement flow rate (m³/s), $D_1$ is the reactor casing inner diameter, and $D_2$ is the tubular diameter.

The process and reactor of this invention are particularly suited for the production of polydienes or copolymers thereof. Conjugated dienes that may be polymerized include 1,3-butadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene. Mixtures of two or more conjugated dienes may also be utilized in co-polymerization. The preferred conjugated dienes are 1,3-butadiene, isoprene, 1,3-pentadiene, and 1,3-hexadiene. In one embodiment, the monomer includes 1,3-butadiene, which advantageously provides narrow molecular weight high cis-1,4-polybutadiene that has narrow molecular weight distribution.

These conjugated dienes can be polymerized in conjunction with vinyl aromatic monomer such as vinyl aromatic compounds such as styrene. The amount of copolymerizable monomer is not limited, but may be less than 50 percent by weight (pbw), in other embodiments less than 40 pbw, and in other embodiments less than about 30 pbw of the entire polymer.

The catalyst employed in practicing the process of this invention include preferably anionic polymerization initiators or certain coordination catalyst systems.

Any anionic initiator can be employed to initiate the formation and propagation of the living polymers. In one or more embodiments, the anionic initiator comprises at least one element from Group 1 or Group 2 of the Periodic Table, according to the new notation of the IUPAC, as reported in *Hawley's Condensed Chemical Dictionary*, (13th Ed. 1997). The elements in Groups 1 and 2 are commonly referred to as alkali metals and alkaline earth metals, respectively. In certain embodiments, the anionic initiator comprises lithium.

Exemplary initiators include, but are not limited to, alkyl lithium initiators such as n-butyl lithium, arenyllithium initiators, arenylsodium initiators, N-lithium dihydrocarbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the alkyl lithium adducts of substituted aldimines and substituted ketimines, and N-lithio salts of substituted secondary amines. Exemplary initiators are also described in the following U.S. patents: U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In one or more embodiments, the anionic polymerization is conducted in the absence of lanthanide compounds such as those used in coordination catalysis.

The amount of initiator employed in conducting anionic polymerizations can vary widely based upon the desired polymer characteristics. In one embodiment, the amount employed is about 0.1 to about 100, and in other embodiments from about 0.33 to about 10 mmol of lithium per 100 g of monomer.

Coordination catalyst systems include lanthanide-based catalyst systems. These catalyst compositions are typically formed by combining (a) a lanthanide compound, (b) an alkylating agent, and (c) a halogen-containing compound. These systems are well known in the art as described in U.S. Pat. Nos. 3,297,667, 3,541,063, 3,794,604, 4,461,883, which are incorporated herein by reference. Other lanthanide-based catalyst and process for their use are described in U.S. Pat. Nos. 4,444,903, 4,525,594, 4,699,960, 5,017,539, 5,428,119, 5,064,910, and 5,844,050, which are incorporated herein by reference. In certain embodiments, an aluminoxane can be used in lieu of or in conjunction with the alkylating agent as well as the source of halogen.

Anionic and coordination polymerizations are typically conducted in a polar solvent such as tetrahydrofuran (THF), a nonpolar hydrocarbon such as the various cyclic and acyclic hexanes, heptanes, octanes, pentanes, their alkylated derivatives and mixtures thereof, or an aromatic solvent such as benzene or toluene.

In one or more embodiments, the amount of solvent employed may be about 50 to about 90, in other embodiments from about 65 to about 85, and in other embodiments from about 75 to about 85% by weight of the polymerization medium.

Another advantage of practicing one or more embodiments of this invention is the ability to polymerize monomer at a higher solids content. In one or more embodiments, the solids content of the polymerization medium can be in excess of 20% by weight, in other embodiments in excess of 21% by weight, in other embodiments in excess of 22% by weight, and in other embodiments in excess of 23% by weight up to about 25% by weight. The advantageously high solids content at which the polymerization process of this invention can operate can also be quantified in terms of the percent increase in solids over batch or continuous processes that are designed to achieve maximum live end content (e.g., in excess of 50%, 60%, or 70% live ends). In one or more embodiments, the process of this invention can operate in excess of 1% by weight, in other embodiments in excess of 2% by weight, in other embodiments in excess of 3% by weight, and in other embodiments in excess of 4% by weight solids over the solids content of otherwise similar batch or continuous polymerization processes. As a result, the process of one or more embodiments of this invention can advantageously operate at greater production rates and achieve greater throughput than batch or convention continuous processes. Indeed, this higher throughput can be achieved by one or more embodiments of this invention even though the total reactor volume is reduced based upon the configuration of the annulus (i.e., the reactor volume of a reactor tank of the present invention is reduced based upon the size of the inner tubular 55 as compared to an otherwise similar reactor that simply includes outer reactor shell 50 with a conventional stirring mechanism therein.

Also, the process of this invention can advantageously tolerate higher polymerization temperatures, which may result from operation at higher solids content. Indeed, polymerization temperatures in excess of 80° C., in other embodiments in excess of 95° C., and in other embodiments in excess of 105° C. up to about 135° C. can be tolerated. Despite these increased temperatures, the resultant product of one or more embodiments retains an advantageously high live end content.

In one or more embodiments, a functionalizing agent is reacted with the living polymer end. This reaction can be achieved by simply mixing the functionalizing agent with the living polymer. Without intending to be bound to any particular theory, it is believed that the anionic-living polymer reacts with the functionalizing agent via a nucleophilic substitution reaction.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25, or in other embodiments within 35 minutes of the peak polymerization temperature.

The amount of functionalizing agent employed to prepare the functionalized polymers is best described with respect to the equivalents of lithium or metal cation associated with the initiator. For example, where a lithium initiator is employed, the moles of functionalizing agent per mole of lithium may be about 0.3 to about 2, optionally from about 0.6 to about 1.5, optionally from about 0.7 to about 1.3, and optionally from about 0.8 to about 1.1.

In one or more embodiments, the terminating agents include tin tetrachloride, $(R)_3SnCl$, $(R)_2SnCl_2$, $RSnCl_3$, carbodiimides, N-cyclic amides, N,N' disubstituted cyclic ureas, cyclic amides, cyclic ureas, isocyanates, Schiff bases, 4,4'-bis (diethylamino)benzophenone, alkyl thiothiazolines, carbon dioxide, alkoxy silanes $Si(OR)_4$, $RSi(OR)_3$, $R_2Si(OR)_2$ cyclic siloxanes, and mixtures thereof, where the organic moiety R is selected from the group consisting of alkyls having from 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and the aralkyl groups include phenyl, benzyl and the like. Specific examples include tetraethyl ortho silicate, tributyl tin chloride, dibutyl tin dichloride and 1,3-dimethyl-2-imidazolidinone, primary, secondary, and tertiary amines, cyclic amine agents, boron-containing compounds, isocyanatoalkoxysilane agents or sulfur-containing heterocycles. Other exemplary agents include 1,3-dimethylimidazolidinone (DMI), N-methylpyrrolidinone (NMP), carbodiimides such as dicyclohexylcarbodiimide (DCC), benzonitrile or other substituted nitriles, substituted aziridines, thiazolines, dialkylaminobenzaldehydes, bis(dialkylamino)benzophenones, substituted epoxy compounds, N-methylcaprolactam, substituted Schiff bases, substituted styrylmethyl derivatives, vinyl pyridine, short blocks of polyvinylpyridine, polysulfoxides, poly(carbodiimides), poly(meth)acrylamides, poly(aminoalkyl(meth)acrylates), polyacrylonitrile, polyethylene oxide (PEO), butyl glycidyl ether, diphenyl ethylene, functionalized styrene, monoglycidyl siloxanes, and polysiloxanes having epoxide end agents. Examples of monoglycidyl siloxanes include 3-glycidoxypropyltrimethoxysilane (GPMOS). Examples of polysiloxanes having epoxide end agents include monoglycidyl ether-terminated polysiloxanes such as monoglycidyl ether terminated poly(dimethylsiloxane).

Exemplary trialkyl tin agents are disclosed in U.S. Pat. No. 5,268,439, which is incorporated herein by reference. Exemplary cyclic amine agents are disclosed in U.S. Pat. Nos. 6,080,853, 5,786,448, 6,025,450, and 6,046,288, which are incorporated herein by reference. Exemplary sulfur-containing heterocycles are disclosed in WO 2004/020475, which is incorporated herein by reference. Silicon-containing functional agents are disclosed in U.S. Pat. Nos. 6,008,295 and 6,228,908, where are incorporated herein by reference. Boron-containing functional agents are disclosed in U.S. Provisional Application No. 60/591,065, which is incorporated herein by reference. Exemplary isocyanatoalkoxysilane agents are disclosed in U.S. Provisional Application Ser. Nos. 60/477,012 and 60/477,013, which are incorporated herein by reference. Useful terminating reagents are disclosed in U.S. Pat. Nos. 5,502,131, 5,496,940 and 4,616,069, which are incorporated herein by reference. Numerous terminating agents can be employed.

Other coupling or functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, among other places, U.S. patent application Ser. Nos. 10/296,084, 10/296,082, and 10/381,829; U.S. Pat. Nos. 4,906,706, 4,990,573, 5,064,910, 5,567,784, and 5,844,050; Japanese Patent Application Nos. 05-051406A, 05-059103A, 10-306113A, and 11-035633A, which are incorporated herein by reference.

In certain embodiments, the functionalizing agent can be employed in combination with other coupling or terminating agents. The combination of functionalizing agent with other terminating agent or coupling agent can be in any molar ratio. The coupling agents that can be employed in combination with the functionalizing agent include any of those coupling agents known in the art including, but not limited to, tin tetrachloride, tetraethyl ortho silicate, and tetraethoxy tin, and silicon tetrachloride. Likewise, any terminating agent can be employed in combination with the functionalizing agent (i.e., the cyclicaminoalkoxysilane) including, but not limited to, tributyltin chloride.

After formation of the functional polymer, a processing aid and other optional additives such as oil can be added to the polymer cement. The functional polymer and other optional ingredients may then be isolated from the solvent and optionally dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The process of this invention provides several advantages. The ability to conduct these continuous polymerizations within an annular reaction zone as specified herein can substantially eliminate backmixing as well as the non-uniform flow effects caused by the parabolic velocity profile of reactants through the reactor. As a result, the reactants can have a substantially uniform residence time within the reactor. Also, termination and branching reactions are minimized because of the ability to conduct the continuous reaction at higher flow rates and higher temperatures within the annular reaction zone due to the absence of backmixing. As a result, the resulting polymers have also been found to have a higher content of live or pseudo-living ends as they exit the reactor.

The polymer product produced by one or more embodiments of this invention is advantageously unique. In one or more embodiments, the polymer product is characterized by a narrow molecular weight distribution and high live end content (or greater functionalization after addition of a functionalizing agent).

In one or more embodiments, the molecular weight distribution, which is defined as the weight average molecular weight ($M_w$) divided by the number average molecular weight ($M_n$), is less than 1.6, in other embodiments less than 1.4, and in other embodiments less than 1.3. In these or other embodiments, the molecular weight distribution is greater than 1.0 and in other embodiments greater than 1.1.

The molecular weight may advantageously be tailored based upon preference. For example, polymer with an Mn in excess of 50 kg/mole, in other embodiments in excess of 75 kg/mole, and in other embodiments in excess of 100 kg/mole up to about 250 kg/mole can be synthesized. In these and other embodiments, the Mw can be in excess of 100 kg/mole, in other embodiments in excess of 200 kg/mole, and in other embodiments in excess of 300 kg/mole up to about 800 kg/mole or higher.

The resulting polymer (prior to termination or functionalization) of one or more embodiments can also be characterized by at least 60 mole percent, in other embodiments at least 70 mole percent, in other embodiments at least 75 mole percent live ends, and in other embodiments in excess of 80 mole percent, where the mole percent refers to the number of polymers with live ends with respect to the total number of polymers within a given sample.

Inasmuch as the resulting polymers of one or more embodiments of this invention are advantageously characterized by a narrow molecular weight distribution and a high degree of functionality, the resulting polymers of one or more embodiments are particularly useful in the manufacture of tire components. These tire components include treads, subtreads, black sidewalls, body ply skins, and bead fillers. As those skilled in the art appreciate, these tire components derive from rubber formulations or compositions. These rubber compositions may include elastomeric polymers, fillers, extenders, curatives, and numerous other additives that are conventionally employed in the manufacture of tires.

In one or more embodiments, the polymers produced by the process of this invention can be employed as the elastomeric component of the rubber formulation. In other embodiments, the polymers produced by the process of this invention can be employed in conjunction with one or more additional elastomers, which are sometimes called rubbery elastomers or rubbery polymers.

Rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Preferred elastomers include homopolymers or copolymers of conjugated $C_4$-$C_{12}$ dienes, $C_8$-$C_{18}$ monovinyl aromatic monomers, and $C_6$-$C_{20}$ trienes.

Where the functionalized polymers of this invention are employed in conjunction with other rubbery elastomers, the elastomeric component of the tire formulation may include from about 5 to about 100% by weight, in other embodiments from about 10 to about 90% by weight, and in other embodiments from about 20 to about 80% by weight of the functionalized polymers of this invention, with the balance including the additional elastomers.

A multitude of rubber curing agents may be employed, including sulfur or peroxide-based curing systems. Curing agents are described in *Kirk-Othmer, Encyclopedia of Chemical Technology*, Vol. 20, pp. 365-468, ($3^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference. Vulcanizing agents may be used alone or in combination.

The vulcanization accelerators are not particularly limited. Examples include thiazoles, dithiocarbamates, dithiophosphates, guanidines, sulfenamides, sulfenimides, and thiurams. Specific examples include 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine. If used, the amount of accelerator is preferably from about 0.1 to about 5 phr, more preferably from about 0.2 to about 3 phr.

The fillers that can be employed include those fillers that are conventionally employed in the manufacture of tires. Useful fillers include inorganic and organic fillers. The organic fillers include carbon black and starch. The inorganic fillers may include silica, aluminum hydroxide, magnesium hydroxide, clays (hydrated aluminum silicates), and mixtures thereof.

Useful processing or extender oils include those that are conventionally employed in the manufacture of polymers or tire compositions. Preferred oils include those that are commercially available as paraffinic, aromatic, or naphthenic oils. In one embodiment, these oils include those low in polycyclic aromatic content such as "black oil." The preferred oils are those that will not plasticize or soften the thermoplastic domains or blocks of the block copolymer at temperatures where these glassy or hard domains may be advantageous.

The tire components may also include other additives that are conventionally employed in the manufacture of tires. These components or constituents include waxes, scorch inhibiting agents, processing aids, zinc oxide, tackifying resins, reinforcing resins, fatty acids such as stearic acid, peptizers, and one or more additional rubbers.

The tire components preferably include at least 3 parts by weight, more preferably at least 5 parts by weight, even more preferably at least 12 parts by weight, and still more preferably at least 25 parts by weight filler per 100 parts by weight rubber (i.e., the elastomeric component); and the tire components preferably include less than 85 parts by weight, more preferably less than 70 parts by weight, even more preferably less than 50 parts by weight, and still more preferably less than 45 parts by weight filler per 100 parts by weight rubber. Where carbon black and silica are employed in combination, the weight ratio of carbon black to silica is from about 1:99 to about 99:1, preferably from about 1:50 to about 50:1, even more preferably from about 1:25 to about 25:1, and still more preferably from about 1:5 to about 5:1.

The tire components also preferably include from about 0 to about 80, more preferably from about 5 to about 50, and even more preferably from about 10 to about 30 parts by weight processing or extender oil per 100 parts by weight rubber.

In one or more embodiments, the preparation of vulcanizable compositions and the construction and curing of the tire is not affected by the practice of this invention.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in Stephens, *The Compounding and Vulcanization of Rubber*, in *Rubber Technology* (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents. It is believed that this procedure will enhance the opportunity that the functionalized polymer will react or interact with silica before competing with coupling or shielding agents, which can be added later curing remills.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Samples 1-12

A series of polymer samples were prepared by employing conventional continuous polymerization techniques. In particular, a continuously stirred tank reactor (CSTR) having a volume of about 25 liters was charged with a polymerization medium that included 1,3-butadiene monomer and styrene monomer dissolved in hexanes at a solids content of about 16 to about 18%. The total monomer feed included about 28 to about 32% styrene, with the balance including butadiene. The reactor was also charged with about 0.044 to about 0.05 parts by weight of n-butyllithium per 100 parts by weight monomer.

The CSTR employed for Samples 1-12 had a diameter of about 20 cm and was equipped with a scrape-wall agitator, which included parallel bars or scrapers positioned parallel with and spaced about 10 cm from a center shaft that had a diameter of about 2.5 cm. In general, the parallel scrapers were positioned approximate to the wall of the reactor so as to impact the polymerization medium at or near the wall of the reactor.

Following the polymerization, a sample of the polymer product was extracted and analyzed for living ends by employing conventional titration methods. The remainder of the polymer sample was terminated by reacting it with a functionalizing agent.

The polymer product for each trial was recovered form the polymerization medium (i.e., solvent and residual monomer) by employing direct drum drying techniques. The polymer product was then analyzed.

Table I provides the percent conversion of each trial, the Mooney Viscosity at 100° C. $ML_{(1+4)}$, the residence time of the polymerization, the peak polymerization temperature, the molecular weight distribution of the resultant polymer, and the throughput of the reaction.

Samples 13-30

A series of polymer samples were prepared by employing similar procedures to that of Samples 1-12 except that a different reaction configuration was employed. In particular, the reactor employed in Samples 1-12 was equipped with a "fat shaft" mixing apparatus. This mixing apparatus was similar to that shown in FIG. 5. Specifically, the inner tubular had a diameter of about 15 cm and was equipped with tabs that had a width of about 1.3 cm. As a result, an annular reactor having an annular diameter of about 2.5 cm was created. In most other respects, the polymerization medium was similar, although the initiator charge included from about 0.042 to about 0.057 parts by weight n-butyllithium per 100 parts by weight monomer. Similar analysis to that performed in Samples 1-12 was performed, and the results are set forth in Table I.

TABLE I

| Sample No. | % Conv | $ML_{(1+4)}$ @ 100° C. | Residence Time | Peak Temp (° C.) | Mw/Mn | Throughput g/Hr | % Living ends |
|---|---|---|---|---|---|---|---|
| | | | Stand Agitation | | | | |
| 1 | 99.7 | 26 | 45 | 94.4 | 1.8 | 3629 | n/a |
| 2 | 99.6 | 35 | 45 | 94.4 | 1.8 | 3629 | n/a |

TABLE I-continued

| Sample No. | % Conv | ML$_{(1+4)}$ @ 100° C. | Residence Time | Peak Temp (° C.) | Mw/Mn | Throughput g/Hr | % Living ends |
|---|---|---|---|---|---|---|---|
| 3 | 99.2 | 44 | 35 | 95.0 | 1.84 | 4627 | n/a |
| 4 | 99.3 | 34 | 35 | 93.9 | 1.76 | 4627 | n/a |
| 5 | 98.8 | 43 | 25 | 95.6 |  | 6486 | n/a |
| 6 | 98.7 | 42 | 25 | 95.0 | 1.74 | 6486 | n/a |
| 7 | 98.9 | 38 | 30 | 95.0 | 1.77 | 5398 | n/a |
| 8 | 98.6 | 41 | 40 | 91.1 | 1.79 | 4037 | n/a |
| 9 | 97.5 | 38 | 40 | 92.8 | 1.82 | 4037 | n/a |
| 10 | 93.2 | 36 | 40 | 86.7 | 1.65 | 3810 | 73 |
| 11 | 96.3 | 42 | 50 | 87.2 | 1.74 | 3447 | 68 |
| 12 | 96.5 | 39 | 50 | 87.2 | 1.79 | 3447 | 77 |
| 13 | 99.8 | 71 | 35 | 101.1 | 1.39 | 3447 | n/a |
| 14 | 99.9 | 38 | 35 | 95.0 | 1.51 | 3447 | n/a |
| 15 |  | 37 | 25 | 101.7 | 1.4 | 4808 | n/a |
| 16 | 99.3 | 33 | 18 | 109.4 | 1.33 | 6668 | n/a |
| 17 | 99 | 27 | 18 | 101.1 | 1.39 | 5942 | n/a |
| 18 |  | 45 | 18 | 101.4 | 1.34 | 5942 | n/a |
| 19 |  | 58 | 25 | 102.2 | 1.35 | 4264 | n/a |
| 20 |  | 41 | 25 | 101.1 | 1.34 | 4264 | n/a |
| 21 | 98 | 67 | 25 | 107.8 | 1.36 | 4536 | n/a |
| 22 |  | 44 | 25 | 101.1 | 1.47 | 4536 | n/a |
| 23 |  | 39 | 25 | 105.6 | 1.41 | 4536 | n/a |
| 24 | 99.7 | 41 | 18 | 105.0 | 1.33 | 5942 | n/a |
| 25 | 99.7 | 53 | 14 | 106.7 | 1.46 | 7620 | n/a |
| 26 | 98.2 | 33 | 16 | 111.1 |  | 7620 | n/a |
| 27 | 99.7 | 36 | 25 | 108.3 |  | 4536 | 80 |
| 28 | 99.5 | 47 | 20 | 112.8 |  | 5670 | n/a |
| 29 | 99.4 | 37 | 25 | 107.2 |  | 4536 | 85 |
| 30 | 99.2 | 51 | 20 | 112.8 |  |  |  |

Various modifications and alterations that do not depart from the scope and spirit of this invention will become apparent to those skilled in the art. This invention is not to be duly limited to the illustrative embodiments set forth herein.

What is claimed is:

1. A process for the continuous polymerization of monomer, the process comprising:
   (a) adding monomer and catalyst to an annulus within an annular reactor to form a polymerization medium within the annulus, where the annulus includes the space between an outer casing wall and an inner tubular wall, and wherein the inner tubular wall includes protrusions extending from the inner tubular wall and terminating within the annulus;
   (b) allowing the polymerization medium a sufficient residence time within the annulus to provide a polymer product;
   (c) removing the polymer product from the annulus.

2. The process of claim 1, where the residence time within the annulus is controlled by regulating the feed rate of the polymerization medium.

3. The process of claim 1, where said inner tubular wall rotates around its longitudinal axis.

4. The process of claim 1, where said annular reactor includes a cylindrical reactor shell and a shaft positioned longitudinally therein, said shaft defining the inner tubular wall and said reactor shell defining the outer casing wall.

5. The process of claim 4, further comprising the step of rotating the shaft.

6. The process of claim 1, where said inner tubular wall rotates.

7. The process of claim 6, where the process is defined by a Reynolds number that is in excess of 7.8, where the reference number is defined by the formula $$N*(D_2/D_1)*D_1^2*\rho/\mu.$$

where N is the rotational speed of the shaft in revolutions per second $D_1$ is the inside diameter established by the outer casing wall, $D_2$ is the outer diameter established by the inner tubular wall, p is the cement density in Kg/m$_3$, and μ is cement viscosity kg/m.s.

8. The process of claim 7, where the superficial upward velocity of the polymerization medium is equal to or greater than $5\times5^{-5}$ where the superficial or velocity of the cement (V) is defined by the formula $$V=F/(\pi/4*(D_1^2-D_2^2))$$

where V is the superficial upward velocity of the cement, F is the cement flow rate (m$^3$/s), $D_1$ is the casing diameter, and $D_2$ is the tubular diameter.

9. A process for the continuous polymerization of monomer, the process comprising:
   (a) adding monomer and catalyst to an annulus within an annular reactor to form a polymerization medium within the annulus, where the annulus includes the space between an outer casing wall and an inner tubular wall, wherein the inner tubular wall rotates around its longitudinal axis, and means for creating radial turbulence within the polymerization medium extend from the inner tubular wall into the annulus;
   (b) allowing the polymerization medium a sufficient residence time within the annulus to provide a polymer product;
   (c) removing the polymer product from the annulus.

10. The process of claim 9, where the inner tubular wall includes protrusions.

11. The process of claim 9, where said means for creating radial turbulence include protrusions.

12. A process for the continuous polymerization of monomer, the process comprising:

(a) adding monomer and catalyst to an annulus within an annular reactor to form a polymerization medium within the annulus, said annular reactor having an outer casing wall and a shaft coaxial with said outer casing wall, wherein the annulus includes the space between the outer casing wall and an inner tubular wall provided by the shaft, wherein the shaft is sealed so as to prevent the polymerization medium from entering into the shaft, and wherein the inner tubular wall includes protrusions extending from the inner tubular wall and terminating within the annulus;

(b) allowing the polymerization medium a sufficient residence time within the annulus to provide a polymer product;

(c) removing the polymer product from the annulus.

* * * * *

UNITED STATES PATENT AND TRADEMARK OFFICE
CERTIFICATE OF CORRECTION

PATENT NO. : 7,442,748 B2 Page 1 of 1
APPLICATION NO. : 11/069679
DATED : October 28, 2008
INVENTOR(S) : William M. Cole et al.

It is certified that error appears in the above-identified patent and that said Letters Patent is hereby corrected as shown below:

Column 14, claim 8, line 39 by changing "$5x5^{-5}$" to read --$5x10^{-5}$--.

Signed and Sealed this

Tenth Day of March, 2009

JOHN DOLL
*Acting Director of the United States Patent and Trademark Office*